Patented Dec. 8, 1953

2,662,025

UNITED STATES PATENT OFFICE 2,662,025

LINOLEUM PASTE AND METHOD FOR MAKING SAME

Leslie L. Keene, Los Angeles County, Calif.

No Drawing. Application October 31, 1950, Serial No. 193,289

2 Claims. (Cl. 106—123)

This invention relates to a method for producing a paste more particularly adapted for cementing linoleum in place and to the product resulting from said method.

Linoleum paste comprises two essential ingredients, namely, clay, either lignin pitch or lignin liquor, and water. In methods now used for producing this paste, non-uniform results are obtained because the clay varies considerably in its properties and particularly in its moisture content. Because of such variation, it has been found necessary, by linoleum paste manufacturers, to obtain the clay in comminuted and dried form rather than in its crude state as mined, in order to obtain reasonable uniformity of the end product.

The clay that is used is refractory and has plastic properties and is of the type frequently used in the production of tile conduits for underground use. This clay, as mined, varies in its moisture content. Generally, such variation is between 6% and 18%.

It will be realized that the clay, as mined, is considerably less costly than clay that has been dehydrated, comminuted and packaged in sacks, but the linoleum paste manufacturer has, heretofore, found it impossible to avoid the expensive preliminary treatment of the clay because he was unable to handle the crude clay advantageously.

An exemplary known method is carried out as follows and entails steps carried out by three separate parties or firms—the firm mining the clay, the firm preparing the mined clay, and the firm using the prepared clay in the manufacture of linoleum paste. After one firm has mined the clay, the same is shipped to a second firm that dehydrates the clay, grinds the same in mills to comminuted form to pass through a mesh of a certain size, and sacks the comminuted product. This sacked product is obtained by the paste manufacturer at a cost (both for the material and shipping charges) that, at the present time, is some two and one-half times greater than the cost of crude mined clay.

Whereas known linoleum paste manufacturing methods entail using expensive treated clay, as above indicated, it is an object of the present invention to obviate such preliminary treatment of the clay and provide a method that uses the clay in its crude mined form, it being contemplated to effect comminution of the clay in the presence of the other ingredients embodied in linoleum paste.

In addition to the clay, the present paste product comprises commercial lignin pitch in preferably powder form, water, and, optionally, a preservative for arresting mold and killing bacteria, and an aromatic for improving the odor of the end product. Instead of the lignin pitch and some of the water, lignin liquor, a viscous product, may be used.

One formula for obtaining 172 gallons of linoleum paste contains the following approximate amounts of materials:

Lignin pitch _____ pounds __ 720
Water _____ gallons __ 60–70
Crude clay _____ pounds __ 1,000
Preservatives and aromatics, to suit.

Place the lignin pitch and most of the water in a mixing vessel and stir until the mixture is reasonably uniform. Before adding the clay to this mixture, determine the moisture content of said clay. Such determination is readily accomplished by placing a small amount of clay in an oven to dehydrate the same and then comparing its initial weight with the weight of the clay after dehydration. After the clay is added to the mixture, all or a portion of the remainder of the water is added, according to the moisture content of the clay. After a period of agitation, during which attrition among the particles will generate some heat and cause some evaporation of the water, the mix will, nevertheless, contain lumps of clay that have not been reduced to comminuted form. However, the mix will have a viscous or paste-like consistency and may be poured from the mixing vessel.

In the above-outlined mixing step, it is preferred that the lignin pitch and the water be first intermixed before the clay is added. To seek to add the pitch and water to the clay not only results in increased mixing time, but also results in a less uniform mix because of the tendency for the clay to stick to and line the walls of the mixing vessel.

The mix is then transferred to a mill or grinder of the type known as a paint mill. Such mills typically have rotor and stator grinding stones that effect fine dispersion of materials passing therebetween. This grinding operation results in a viscous paste-like mass that is free of lumps and is of uniform consistency. The product thus obtained is an adequate commercial linoleum paste which, however, embodies a considerable amount of air in the form of extremely fine bubbles.

In order to remove the included air and obtain a more homogeneous mixture, the material is then transferred to a second mixing vessel wherein, either by prolonged slow agitation or application of a vacuum, the air is removed. At this time, the preservative and/or aromatic ingredients are added to the mix in quantities desired. Phenol functions adequately as a preservative and oil of wintergreen is a suggested aromatic.

As hereinabove indicated, the formula given above may be varied by substituting 68 gallons of lignin liquor for the 720 pounds of pitch and the 45 gallons of water. In this variation, should the clay have a high moisture content, no additional water would be needed. However, some water may be added if the water content of the clay is low. With any of these proportions, it is apparent that the weight of the clay roughly approximates the weight of lignin material and accompanying water, whether the lignin material be in the form of lignin pitch or lignin liquor, thereby producing a paste, as distinguished from a few percent of clay to yield a fluid substance or a few percent of lignin material with water to yield a relatively hard substance.

On the basis of 1,000 pounds of mined crude clay used in the present method, there may be an initial intermixture of proportioned amounts of lignin pitch, lignin liquor and water. It is immaterial whether the pitch or liquor, in such a mixture, is in the larger amount, so long as the proportioned ingredients provide a mass, by volume, that is substantially equal to that of the pitch or the liquor alone. In this regard, the present method is quite flexible and enables the paste manufacturer to employ those ingredients that are more readily available to him at, perhaps, a saving in cost.

The end product is a highly viscous semi-paste that is delivered for commercial distribution in sealed cans or in other ways common in this industry.

While the invention that has been illustrated and described is now regarded as the preferred embodiments, the compositions are, of course, subject to modifications without departing from the spirit and scope of the invention. It is therefore not desired to restrict the invention to the particular forms of construction illustrated and described, but to cover all modifications that may fall within the scope of the appended claims.

Having thus described the invention, what is claimed and desired to be secured by Letters Patent is:

1. A linoleum cement having a viscous, paste-like consistency consisting of about 1000 pounds of run-of-mine unground clay containing naturally occurring water in the amount of from 6% to 18% by weight, a lignin material selected from the group consisting of waste sulphite lignin pitch, waste sulphite lignin liquor and mixtures thereof, and water, the combined weight of the water content of said lignin material and said added water being about 700 pounds.

2. The method of producing a linoleum cement having a viscous, paste-like consistency, consisting of preparing a mixture of about 1000 pounds of run-of-mine clay containing naturally occurring water in the amount of from 6% to 18% by weight, about 700 pounds of waste sulphite lignin liquor and about 70 gallons of water, agitating this mixture to impart a pourable consistency thereto, grinding the mixture to render said mixture homogeneous and thereafter removing the entrained air in said mixture.

LESLIE L. KEENE.

References Cited in the file of this patent

UNITED STATES PATENTS

| Number | Name | Date |
| --- | --- | --- |
| 1,390,435 | Gerlach | Sept. 13, 1921 |
| 2,542,344 | Mersereau | Feb. 20, 1951 |

FOREIGN PATENTS

| Number | Country | Date |
| --- | --- | --- |
| 452 | Great Britain | of 1865 |
| 586,795 | Germany | Oct. 26, 1933 |